(12) United States Patent
Ikegaya

(10) Patent No.: US 6,553,440 B1
(45) Date of Patent: Apr. 22, 2003

(54) DATA TRANSFER EQUIPMENT FOR CONNECTING A SCSI INTERFACE TO AN IEEE 1394 INTERFACE

(75) Inventor: Mitsuhiro Ikegaya, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/471,229

(22) Filed: Dec. 23, 1999

(30) Foreign Application Priority Data

Dec. 24, 1998 (JP) .......................................... 10-367606

(51) Int. Cl.[7] .......................... G06F 13/14; G06F 13/20
(52) U.S. Cl. ............................. 710/62; 710/8; 710/64; 710/65; 710/67; 710/305; 710/313
(58) Field of Search .............................. 710/8, 62, 64, 710/65, 67, 305, 313

(56) References Cited

U.S. PATENT DOCUMENTS

| | | | | |
|---|---|---|---|---|
| 4,852,041 A | * | 7/1989 | Nakano ........................ | 375/377 |
| 5,539,787 A | * | 7/1996 | Nakano et al. ............... | 375/377 |
| 5,615,344 A | * | 3/1997 | Corder ........................ | 710/100 |
| 5,850,526 A | * | 12/1998 | Chou .......................... | 370/477 |
| 6,128,673 A | * | 10/2000 | Aronson et al. ............. | 710/105 |
| 6,185,632 B1 | * | 2/2001 | Berkema ..................... | 709/100 |
| 6,370,603 B1 | * | 4/2002 | Silverman et al. ........... | 709/220 |

FOREIGN PATENT DOCUMENTS

| | | |
|---|---|---|
| JP | 63-173947 | 11/1988 |
| JP | 9-259055 | 10/1997 |
| JP | 9-261550 | 10/1997 |
| JP | 10-154996 | 6/1998 |
| JP | 10-200583 | 7/1998 |
| JP | 10-240666 | 9/1998 |
| JP | 10-254811 | 9/1998 |
| JP | 10-271146 | 10/1998 |
| JP | 10-285322 | 10/1998 |

* cited by examiner

*Primary Examiner*—Jeffrey Gaffin
*Assistant Examiner*—Rehana Perveen
(74) *Attorney, Agent, or Firm*—Foley & Lardner

(57) ABSTRACT

To eliminate topology limitation and termination and to utilize Hot Plug IN/OUT, when connecting SCSI interfaced peripherals to an IEEE 1394 Interfaced computer. The data transfer equipment of the present invention includes a physical layer unit for executing the IEEE 1394 interface, a link layer unit connected with the physical layer, a management fetch unit for storing packets temporarily, a management agent unit for controlling the packets, a data fetch unit for storing control data included in the packets, an interface execution unit. The header on the IEEE 1394 interface is utilized as the header of the data packet, and the command block on the SCSI interface is utilized as the command block of the data packet.

1 Claim, 7 Drawing Sheets

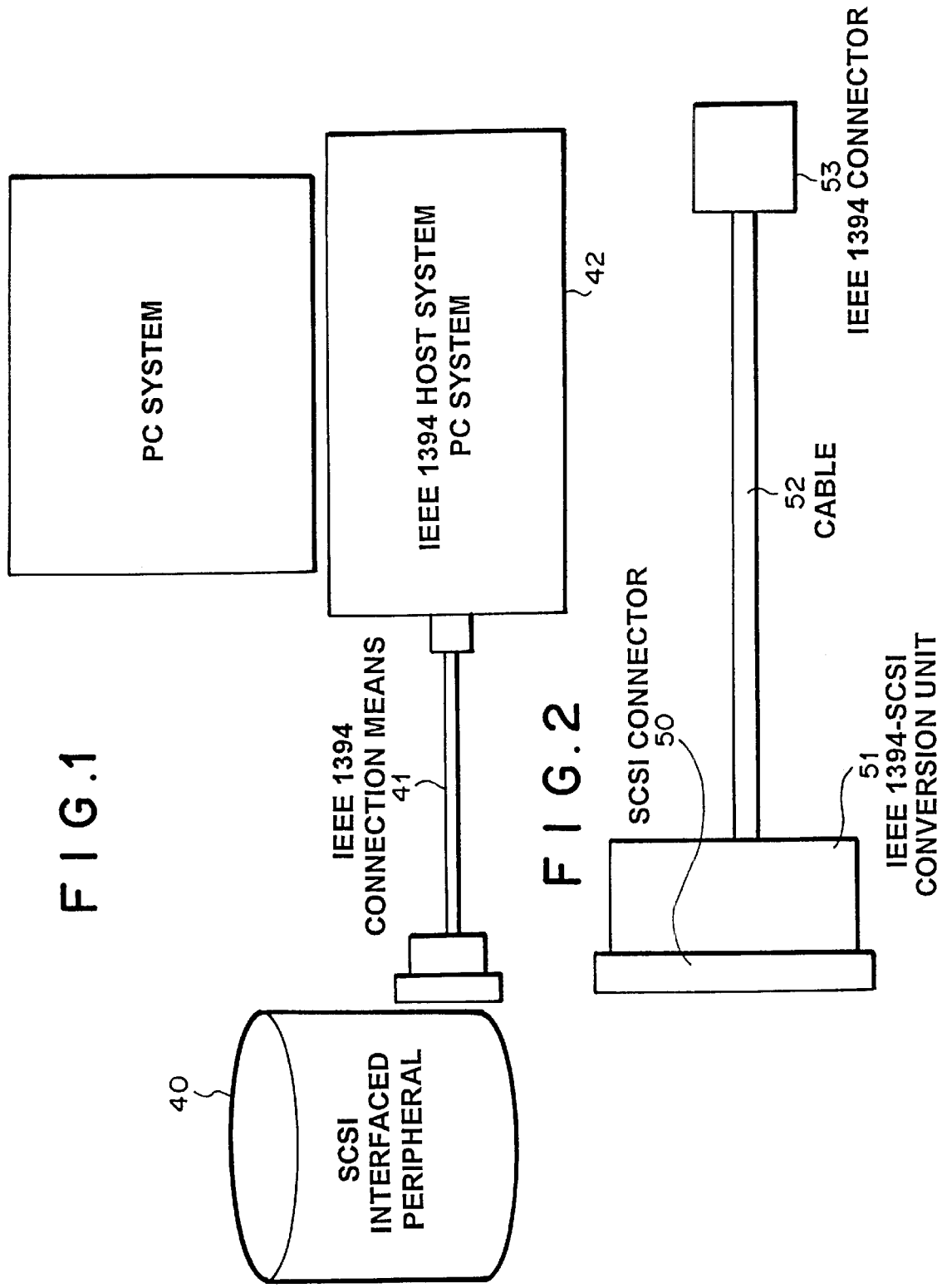

FIG.5

| WIN 32 API |
|---|

| FILE SYSTEM |
|---|

| DISK CLASS | CD/DVD CLASS |
|---|---|

| SBP-2 BUS CLASS |
|---|

| IEEE 1394 BUS CLASS |
|---|

| IEEE 1394 PORT DRIVERS |
|---|

FIG.7

| Bit<br>Byte | 7 | 6 | 5 | 4 | 3 | 2 | 1 | 0 |
|---|---|---|---|---|---|---|---|---|
| 0 | Operation code ||||||||
| 1 | Reserved ||||||||
| 2 | (MSB) Logical block address (if required) ||||||||
| 3 |  ||||||||
| 4 |  ||||||||
| 5 | (LSB) ||||||||
| 6 | (MSB) Transfer length (if required)<br>Parameter list length (if required)<br>Allocation length (if required) ||||||||
| 7 |  ||||||||
| 8 |  ||||||||
| 9 | (LSB) ||||||||
| 10 | Reserved ||||||||
| 11 | Control ||||||||

DATA TRANSFER EQUIPMENT FOR CONNECTING A SCSI INTERFACE TO AN IEEE 1394 INTERFACE

BACKGROUND OF THE INVENTION

1. Technical Field of the Invention

The present invention relates to a data transfer equipment for connecting SCSI (Small Computer System Interface) interfaced peripherals with a computer which has an input/output serial bus interfaces such as IEEE 1394 (Institute of Electrical and Electronics Engineers, Inc., Std. 1394-1995 IEEE standard for a high Performance Serial Bus) in an operation system (OS) environment such as Windows for personal computers.

2. Description of the Prior Art

An interface for connecting a personal computer with a digital video cassette recorder (DCR) is disclosed, for example, in JP 10-254811 A ("Control Method and Equipment for Electronic Appliances").

As shown in FIG. 8, it is disclosed in the above-mentioned document that the control commands for DCR are outputted toward IEEE 1394 communication unit 310 through IEEE 1394 bus 110. Then, system controller 540 converts, through LINK 520, the outputted commands into another kind of commands based on so-called interface device electronics interface (IDE interface) which is a protocol by Western Digital for connecting an IBM/PCAT compatible computer with a hard disk drive (HDD). The commands thus converted is outputted toward IDE controller 710 which outputs data stored in the first-in first-out buffer memory (FIFO memory) 610 through IDE interface 120 toward HDD 400.

However, the conventional data transfer equipment as explained above has a disadvantage that the system becomes large as a whole, because so-called attachment packet interface commands (ATAPI commands) which are completely different from AV/C commands exclusively used for audio visual appliances are required for controlling ADE interfaced appliances, although both ATAPI commands and AV/C commands are defined by IEEE 1394. Concretely, ATAPI commands which are not included in AV/C commands are to be generated.

SUMMARY OF THE INVENTION

Therefore, an object of the present invention is to eliminate the topology limitations and termination in a data transfer equipment wherein IEEE 1394 interface and SCSI interface are employed. Further, another object of the present invention is to connect a personal computer with computer peripherals which has SCSI interfaces, by utilizing Hot Plug In/Out function which is one of the features of IEEE 1394 interface.

The data transfer equipment of the present invention which connects a computer having a first interface with peripherals having a second interface, comprises a first connector connected with the computer, a second connector connected with the peripherals, an interface conversion logic unit for exchanging data between the first interface and the second interface, and a cable for connecting the interface conversion logic unit with the first connector.

More concretely, the data transfer equipment of the present invention comprises a physical layer unit for executing the first interface, a link layer unit connected with the physical layer, a management fetch unit for storing packets temporarily, a management agent unit for controlling the packets, a data fetch unit for storing control data included in the packets, and an interface execution unit for executing the second interface. The management fetch unit transfers operation request block (ORB) to the management agent unit, by analyzing packet header. The management agent unit controls the data fetch unit and the interface execution unit, on the basis of ORB. The data fetch unit stores command block in ORB and send the command block to the interface execution unit.

According to the present invention, the topology limitation is mitigated greatly and the termination is not required, because SCSI interfaced peripherals are connected with IEEE 1394 interfaced computer.

Therefore, Hot Plug IN/OUT is available due to IEEE 1394 interface.

Further, according to the present invention, hand-held or mobile computers are easily connected with SCSI interfaced peripherals by metal wire cables.

BRIEF EXPLANATION OF THE DRAWINGS

FIG. 1 is a block diagram of a data transfer equipment of the present invention.

FIG. 2 is a block diagram of IEEE 1394 connection means included in the data transfer equipment of the present invention.

FIG. 5 is a block diagram of an IEEE 1394 architecture of Windows OS.

FIG. 7 is a table of an example of a SCSI command block.

PREFERRED EMBODIMENT OF THE INVENTION

Figure 3:
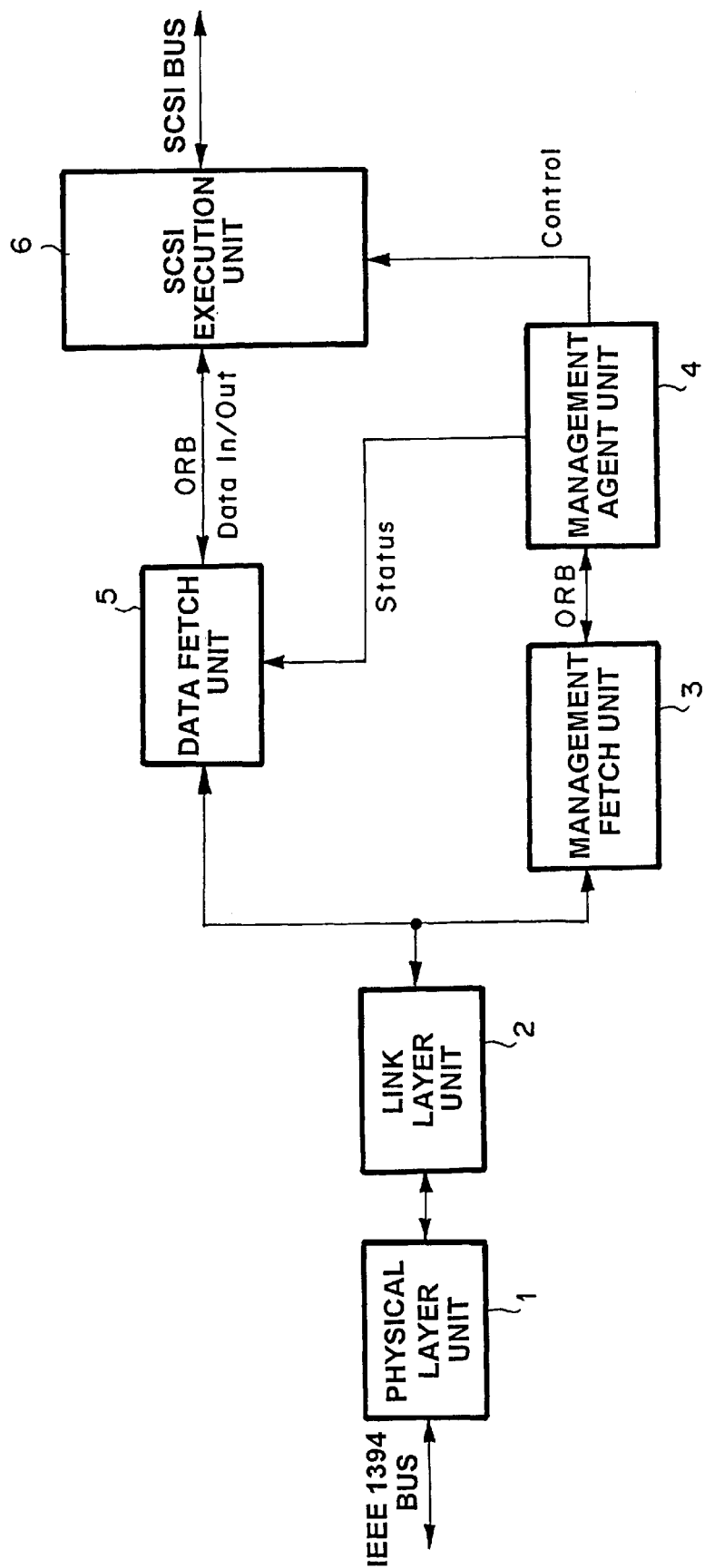
FIG. 3 is a block diagram of IEEE 1394-SCSI conversion logic unit included in the data transfer equipment of the present invention.

A mode of embodiment of the present invention is explained, referring to the drawings.

A block diagram of an example of the data transfer equipment of the present invention is shown in FIG. 1. Personal computer 42 having IEEE 1394 host system is connected through IEEE connection means 41 with peripheral 40 having SCSI interface.

A block diagram of IEEE 1394 connection means 41 is shown in FIG. 2. IEEE 1394 connection means 41 comprises IEEE 1394 connector 53 connected with personal computer 42, SCSI connector 50 connected with peripheral 40, and cable 52 for connecting IEEE 1394-SCSI conversion logic unit 51 with IEEE 1394 connector 53.

A block diagram of IEEE 1394-SCSI conversion logic unit 51 is shown in FIG. 3. IEEE 1394-SCSI conversion logic unit 51 comprises physical layer unit 1, link layer unit 2, management fetch unit 3, management agent unit 4, data fetch unit 5, and SCSI execution unit 6.

As shown in FIG. 3, the packet header from IEEE 1394 bus is transmitted through physical layer unit 1 and link layer unit 2 and it is analyzed by management fetch unit 3. When the packet is addressed toward peripheral 40, ORB is sent to management agent unit 4.

Management agent unit 4 controls data fetch unit 5 and SCSI execution unit 6, on the basis of the contents of ORB.

Data fetch unit 5 stores the command block of ORB. The stored command block is transmitted to SCSI execution unit 6.

SCSI execution unit 6 outputs data from data fetch unit 5 toward SCSI bus, on the basis of the stored command block from data fetch unit 5.

Figure 4:
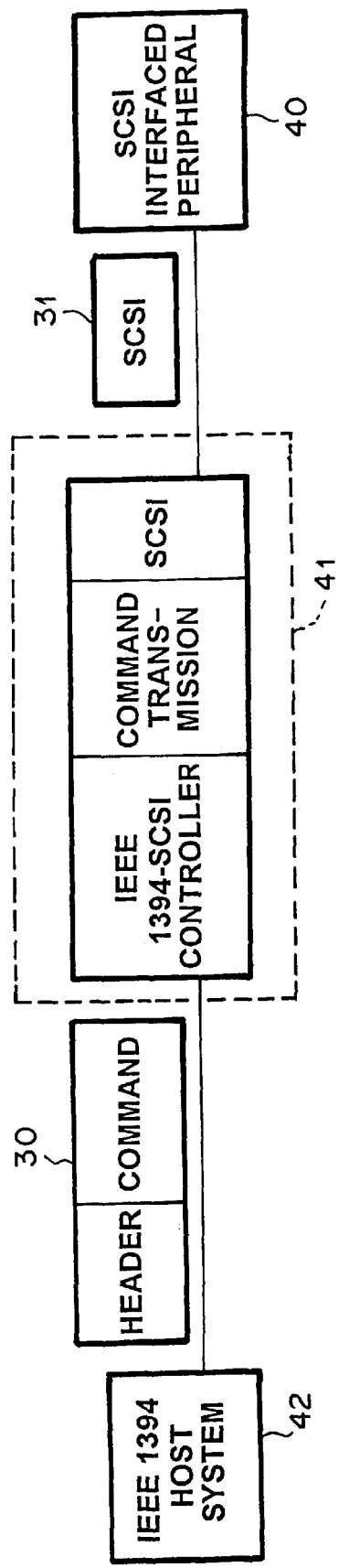
FIG. 4 is a block diagram for explaining the operation of the IEEE 1394-SCSI conversion logic unit included in the data transfer equipment of the present invention.

A flow chart for explaining the operation of IEEE 1394-SCSI conversion logic unit 51 is shown in FIG. 4. IEEE 1394 packet 30 is inputted into IEEE 1394 connection means 41. Then, the IEEE 1394 header of packet 30 is analyzed by the controller of IEEE 1394 connection means 41 in order to determine whether or not the header is directed to SCSI peripheral device 40.

When the header is directed to SCSI!peripheral device 40, the controller of IEEE 1394 connection means 41 analyzes the IEEE 1394 commands which follow the header, and converts it into SCSI command. Then, SCSI command 31 is transferred to the target, i.e. SCSI peripheral device 40.

A block diagram of IEEE 1394 architecture of the Windows OS in personal computer 42 is shown in FIG. 5. The architecture as shown in FIG. 5 is constructed for controlling recording devices using such recording medium as hard disk (HD), compact disk (CD), and digital video disk ((DVD).

Win 32 API stands at the highest rank. Serial data compatible with IEEE 1394 interface is generated by using a hierarchy which comprises Win 32 API, a file system which manages operation system (OS) commonly, a disk class for generating orders for the recording system, a serial bus protocol (SBP-2) which executes mapping the SCSI commands onto IEEE 1394, an IEEE 1394 bus class for controlling IEEE 1394 bus, and an IEEE 1394 port driver for outputting the generated serial data.

Disk class, CD/DVD class, and SBP-2 which integrates these classes are treated by the SCSI command block.

Figure 6:
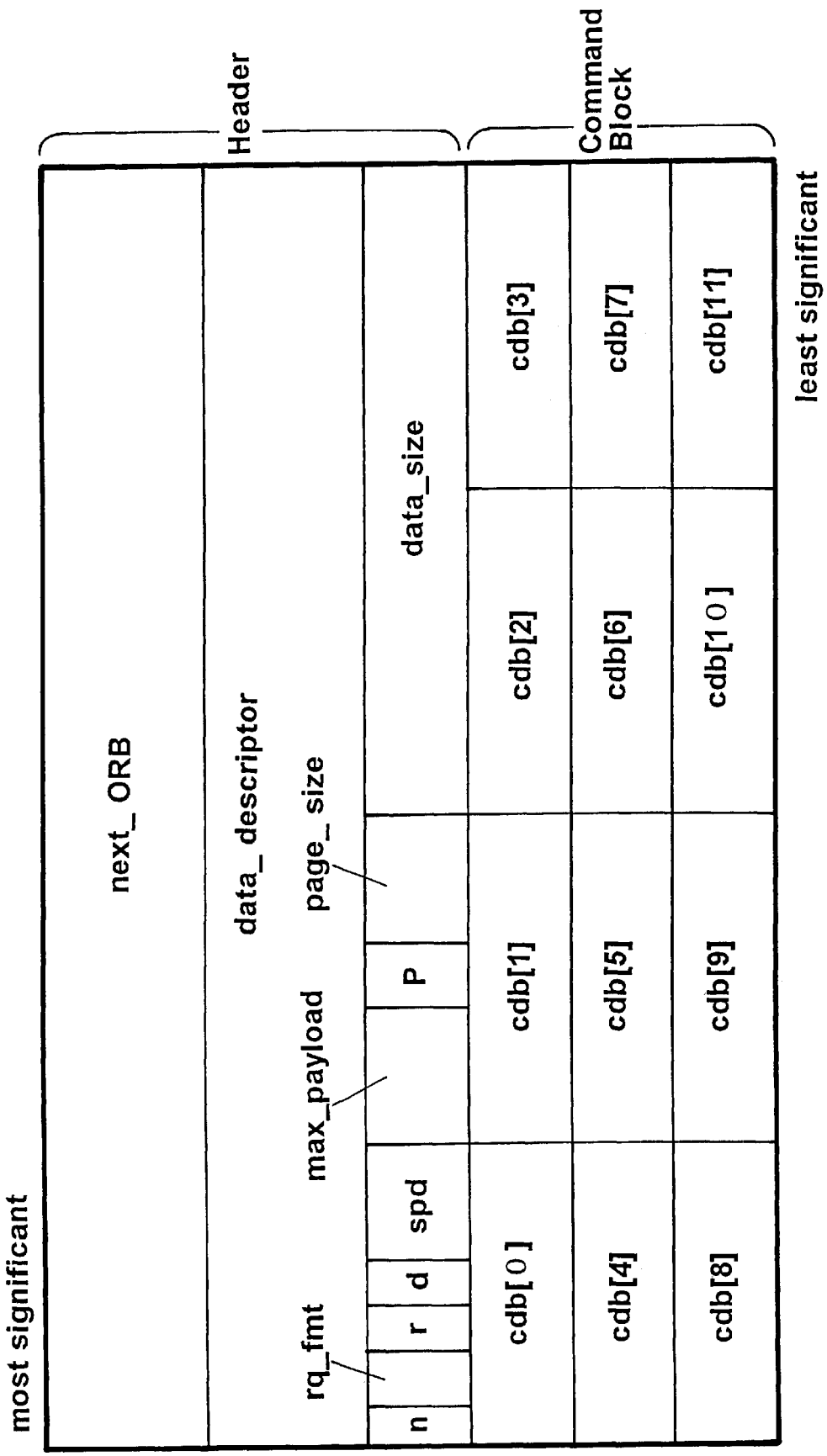
FIG. 6 is a block diagram showing a structure of SCSI command block on the IEEE 1394 interface.
Figure 8:
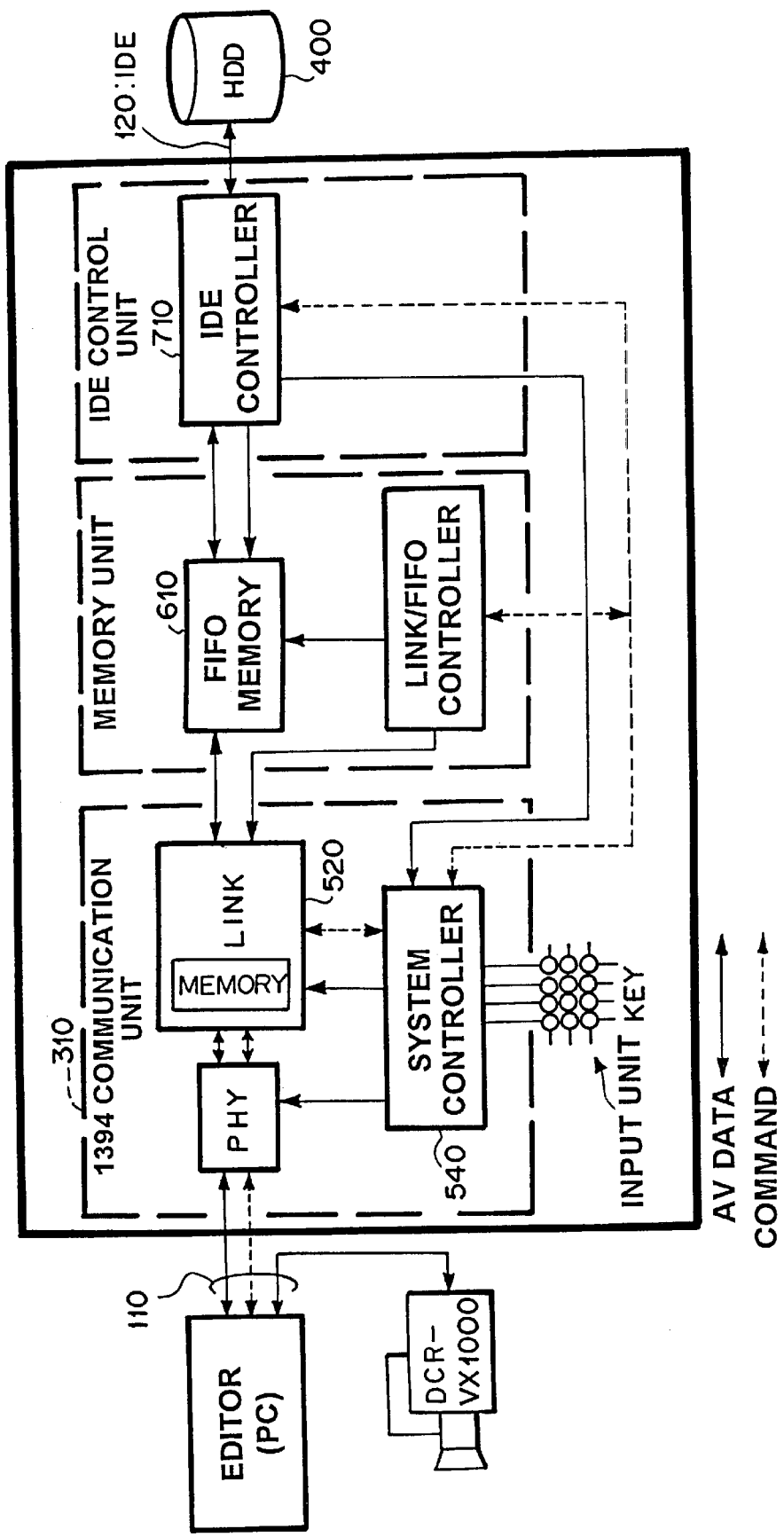
FIG. 8 is a block diagram of a conventional data transfer equipment.

A packet structure for explaining ORB as the SCSI command block is shown in FIG. 6. The Header as shown in FIG. 6 including such blocks as "next_ORB", and "data_size" is the IEEE 1394 header of command ORB on IEEE 1394 interface. The command block following the header as shown in FIG. 6 is the IEEE command block (cdb) wherein SCSI interface commands in 1 Byte unit are inserted.

A 12 Byte command packet on the SCSI interface is exemplified in a table as shown in FIG. 7. cdb[0] as shown in FIG. 6 is the 0th Byte "Operation code" as shown in FIG. 7. Similarly, for example, cdb[1] as shown in FIG. 6 is the 1st Byte "Reserved" code as shown in FIG. 7.

When file systems of HD, CD, DVD are connected with IEEE 1394 interfaced system in an OS environment such as Windows, SCSI interface command is used for the packets on the IEEE 1394 interface. Therefore, the data transfer equipment of the present invention is easy to construct.

What is claimed is:

1. A data transfer apparatus for connecting a computer having an IEEE 1394 interface to a peripheral having a SCSI interface, comprising:

a physical layer unit for connecting with said IEEE 1394 interface;

a link layer unit connected with said physical layer unit;

a management fetch unit for analyzing headers of IEEE 1394 packets received through said link layer unit to determine whether said packets are addressed to said peripheral having said SCSI interface;

a data fetch unit for storing control data included in said IEEE 1394 packets received through said link layer unit;

a SCSI execution unit for converting IEEE 1394 commands received from said data fetch unit to SCSI commands and outputting said SCSI commands to said SCSI interface; and a management agent unit for controlling the data fetch unit and the SCSI execution unit in accordance with operation request blocks (ORBs) of IEEE 1394 packets addressed to said peripheral and supplied to the management agent unit by the management fetch unit;

wherein said management fetch unit provides said ORBs to said management agent unit in accordance with analysis of packet headers, wherein said management agent unit controls said data fetch unit and said interface execution unit in accordance with headers of said ORBs, and wherein said data fetch unit stores command blocks of said ORBs and sends said command blocks to said SCSI execution unit for conversion to SCSI commands.

* * * * *